United States Patent [19]

Moody et al.

[11] Patent Number: 5,176,231

[45] Date of Patent: Jan. 5, 1993

[54] INTERLOCK DEVICE HAVING REDUCED PRELOAD BINDING

[75] Inventors: John W. Moody, Clarkston; Robert Brandt, Brighton; Lawrence A. Wiltfang, Clarkston, all of Mich.

[73] Assignee: Pontiac Coil, Inc., Waterford, Mich.

[21] Appl. No.: 760,708

[22] Filed: Sep. 16, 1991

[51] Int. Cl.⁵ .................... B60K 20/00; B60K 23/00
[52] U.S. Cl. ........................ 192/4 A; 74/477
[58] Field of Search ............ 192/4 A; 74/483 R, 527, 74/578, 477

[56] References Cited

U.S. PATENT DOCUMENTS

| | | | |
|---|---|---|---|
| 4,936,431 | 6/1990 | Shinpo | 192/4 A |
| 4,976,171 | 12/1990 | Sharp et al. | 192/4 A X |
| 4,987,968 | 1/1991 | Martus et al. | 180/272 |
| 5,018,610 | 5/1991 | Rolinski et al. | 192/4 A |
| 5,025,678 | 6/1991 | Shinpo et al. | 74/477 X |

Primary Examiner—Richard Lorence
Assistant Examiner—Nicholas Whitelaw
Attorney, Agent, or Firm—Krass & Young

[57] ABSTRACT

In an electromagnetic interlock of the type in which a pin engages a notched or perforated member, preload releasability is provided by configuring the contacting surfaces of the pin and notch to provide an angle of contact which is always positive. The pin and/or the notch each includes a nonvertical contact surface. In one version of the device, the notch includes an S-shaped contact surface.

11 Claims, 2 Drawing Sheets

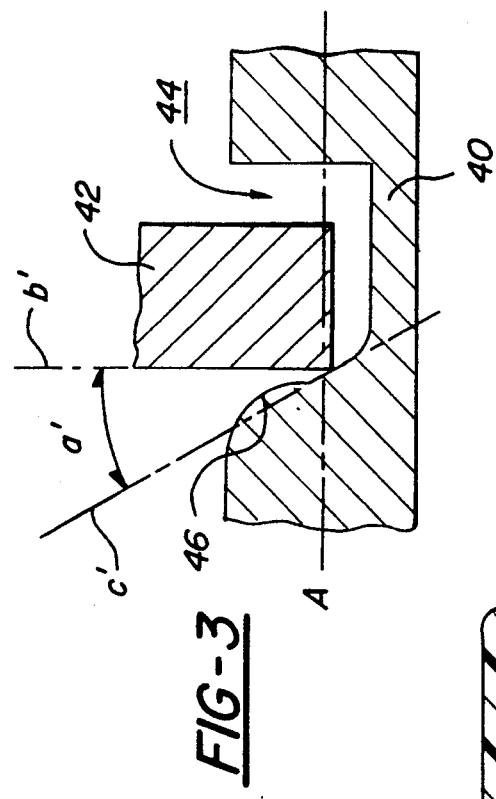
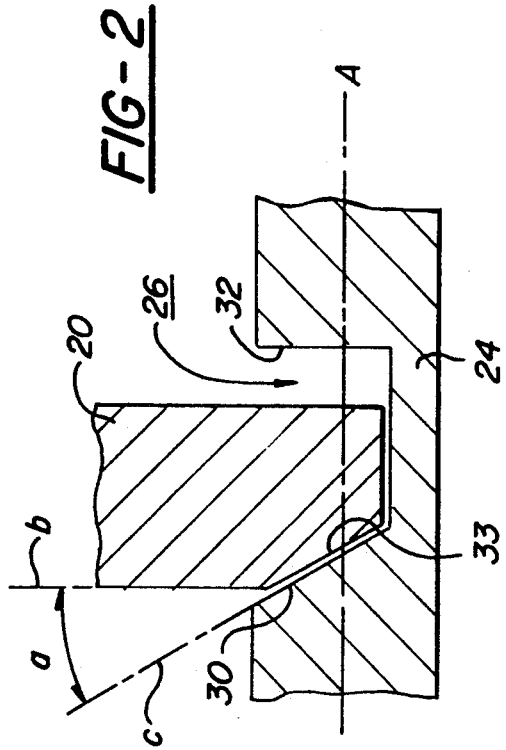
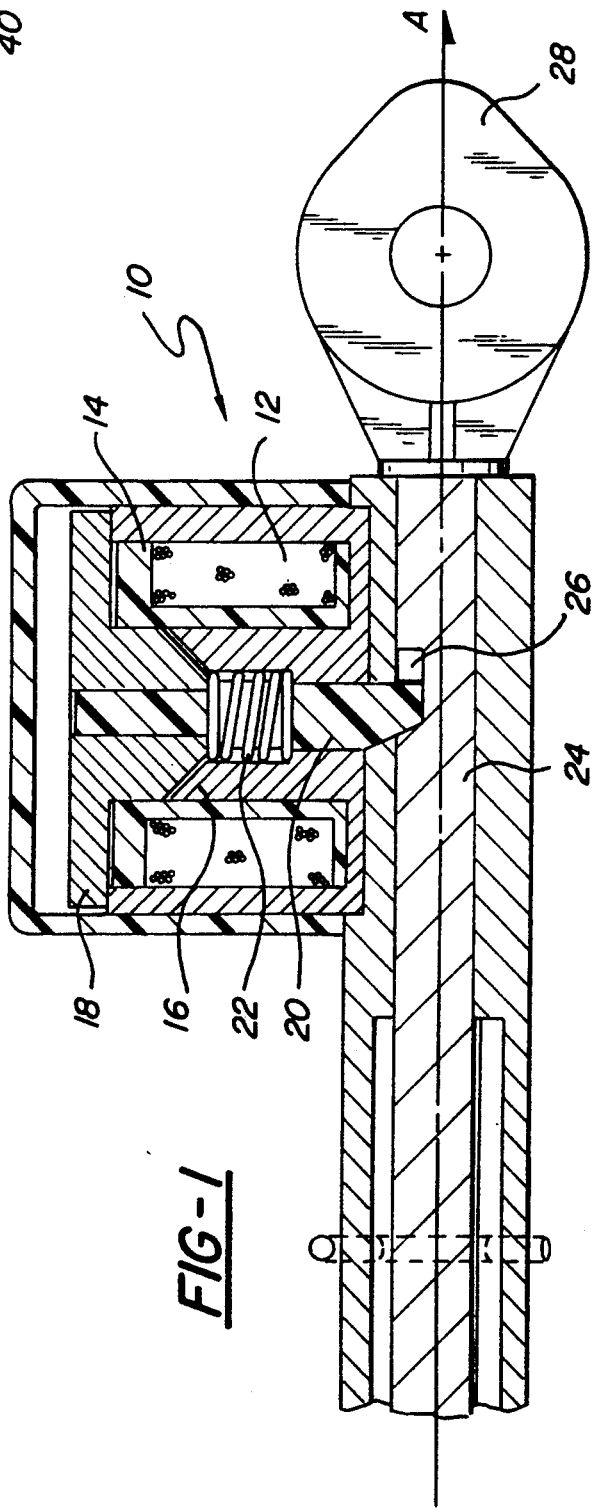

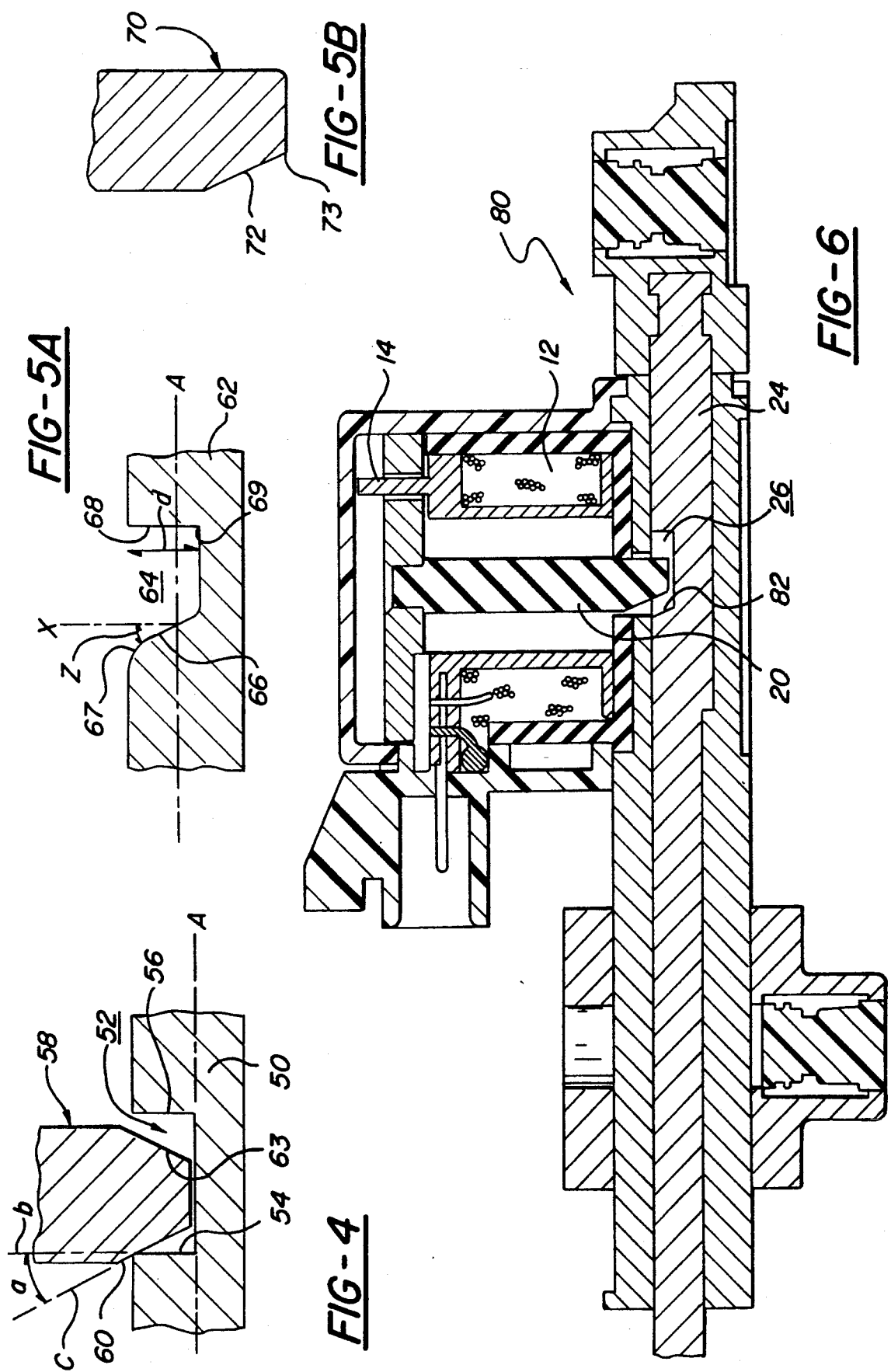

INTERLOCK DEVICE HAVING REDUCED PRELOAD BINDING

FIELD OF THE INVENTION

This invention relates generally to electromechanical interlocks. More specifically, the invention relates to a solenoid based interlock for immobilizing a rod or cable, which interlock is capable of releasing even when under preload. Most specifically, the invention relates to an improved brake transmission safety interlock for a motor vehicle.

BACKGROUND OF THE INVENTION

Solenoids, electromagnets, and other such devices are frequently employed to lock-out or otherwise control a variety of mechanical systems. The brake transmission safety interlock (BTSI) system utilized in motor vehicles is an example of a typical electromechanically controlled system. A BTSI system operates to prevent a vehicle's transmission from being taken out of the park position if the braking system is not activated. A typical BTSI system includes a solenoid, electromagnet or other such electromechanical device disposed in electrical communication with the brake light circuit of the vehicle and is operable to selectively engage and immobilize the shifter linkage if the brake is not activated.

Preload release is a significant concern in systems of this type. In a motor vehicle including a BTSI, preload release can occur when the operator attempts to shift the vehicle out of park prior to engaging the brake. The locking portion of the BTSI system is thereby placed under load and if this load is maintained, the locking system will fail to release even though the brake is subsequently activated. Only upon release of mechanical tension will the interlock release and allow proper shifting. Although preload binding would appear to be a minor problem since it can be simply and obviously overcome by releasing tension on the shift lever and since it can be prevented from occurring in the first place by using the shift and brake controls in proper sequence, driving habits are often very ingrained and automatic. It has been found that many complaints to automobile dealers and manufacturers regarding faulty transmissions are really attributable to operator induced preload binding in BTSI systems. As used within the context of this disclosure "Preload Release" refers to the ability of an interlock to properly release even when it is under a preloaded condition.

The second significant problem occasioned by BTSI systems occurs when there is a failure of the system which results in the permanent lock-up of the shifter linkage. Such failure can result from damage to the solenoid or other electromagnetic device or from failure of an electrical component energizing that device. In either event, the net effect is that the shifting linkage of the vehicle is locked and the driver cannot proceed. Clearly, such a failure can be a nuisance at best and an extreme hazard at worst. For this reason, automotive manufacturers generally prefer to have a "breakthrough" factor built into BTSI systems. By "breakthrough" is meant that the interlock feature of the system may be defeated by application of a significant amount of force to the shifter linkage. It has been found that a breakthrough force of approximately 45 to 75 lbs is desirable since this force can be supplied by most vehicle operators if they make a conscious effort to do so; whereas, it is unlikely that such force would be inadvertently applied to the shifter linkage through accident or inadvertence. It should be noted that in some instances, breakthrough may not be required.

It will thus be appreciated that there is a need for a BTSI system which has preload capability and which can, in those applications where it is desired, be overcome by a breakthrough force in the approximate range of 45 to 75 lbs. It is also desirable that any such system be durable and readily adaptable to a variety of motor vehicle configurations. While the prior art has extensively addressed the field of BTSI systems, it has to date failed to provide any brake transmission safety interlock which can meet the aforementioned criteria.

U.S. Pat. No. 4,987,968 discloses a cable mounted BTSI system in which a solenoid causes a pair of balls to engage a notch in a rod associated with a shifter linkage. U.S. Pat. No. 5,018,610 discloses another interlock system in which a solenoid projects a plunger into a portion of a shifter or linkage. Preload binding has been found to be a significant problem with both of the foregoing types of systems.

As will be described in greater detail hereinbelow, the present invention provides an electromagnetic interlock which is not prone to preload binding. The interlock is readily adaptable for use in a BTSI system and provides for breakthrough at a readily selectable, and repeatable, level of force. The interlock of the present invention is simple and durable and exhibits a long service life. Its compact size and mechanical simplicity allow it to be readily adapted to a variety of applications. These and other features of the invention will be readily apparent from the drawings, discussion and description which follow.

BRIEF DESCRIPTION OF THE INVENTION

There is disclosed herein an electromagnetic interlock which eliminates a preload binding. The interlock comprises a rigid member such as a rod, having a linear axis parallel to the length thereof. The member is disposed so as to be displaceable along its linear axis and it includes a notch formed therein which defines a wall in said member. The interlock further includes a solenoid having a plunger selectively biasable from an immobilized state to a second position in response to an electrical input. The plunger, when in the immobilized state, is subject to a downward bias which causes it to engage the notch and thereby prevent the member from being displaced along its linear axis and when in the second state, is operable to permit the member to be displaced along its linear axis. The plunger and notch are configured so that the angle of contact established therebetween when they are engaged is always positive. The interlock may be configured to apply a second bias to the plunger when it is in the second state to move it to a position clear of the notch or it may be configured to simply release the downward bias and to allow displacement of the member to urge the plunger out of contact with the notch.

In a particular embodiment of the invention, the interlock is mechanically interconnected to the shifter linkage of the vehicle so as to prevent shifting thereof when the member is immobilized. In this embodiment, the solenoid is in electrical communication with the brake system energization circuit of the vehicle in such a manner that the solenoid is in the first position when the brakes are not energized and is in the second position when the braking system is energized. In this embodiment, shifting of the vehicle is prevented if the brakes are not energized.

In another particular embodiment, the plunger of the solenoid and the wall of the notch are configured so that contact therebetween is established via substantially flat surfaces. In one particular embodiment, the plunger and wall are configured so that the angle of contact therebetween is in the range of 20°-50° when the plunger is in the first position. In yet another embodiment, the angle of contact may vary as the plunger is withdrawn from the notch and in one specific embodiment, the angle of contact between the plunger end wall is greater when the plunger is proximate the top of the notch than it is when the plunger is proximate the root of the notch. In another preferred embodiment, the wall of the notch defines a sigmoidal surface.

BRIEF DESCRIPTION OF THE DRAWINGS

FIG. 1 is a cross-sectional view of one particular interlock structured in accord with the principles of the present invention;

FIG. 2 is an enlarged, fragmentary illustration of the rod and plunger of the interlock of FIG. 1;

FIGURE 3 is a cross-sectional view of another embodiment of rod and plunger structured in accord with the principles of the present invention;

FIG. 4 is a cross-sectional view of yet another embodiment of rod and plunger structured in accord with the principles of the present invention;

FIG. 5A is a cross-sectional view of one preferred embodiment of rod structured in accord with the principles of the present invention;

FIG. 5B is a cross-sectional view of one particular embodiment of plunger structured in accord with the principles of the present invention; and FIG. 6 is a cross-sectional view of another embodiment of interlock structured in accord with the principles of the present invention.

DETAILED DESCRIPTION OF THE INVENTION

Referring now to FIG. 1, there is shown one particular embodiment of the present invention as incorporated in a BTSI system of a motor vehicle. The FIG. 1 embodiment includes a solenoid 10 having a coil of wire 12 disposed therein. As illustrated, the coil 12 is wound about a spool 14. The solenoid 10 further includes a pole piece 16 therein and a movable armature 18 which includes a plunger 20 (also referred to as a detent) affixed thereto. The plunger 20 has a spring 22 associated therewith and disposed to bias the pole piece 16 and armature 18 apart. When the solenoid is energized, the coil 12 creates a magnetic field which tends to draw the armature 18 and pole piece 16 together thereby projecting the plunger 20 from the solenoid.

The interlock of FIG. 1 further includes a rod 24 which has a notch 26 disposed therein. The rod is generally elongated along a linear axis, A, and in use in a BTSI includes a fixture 28 for interconnecting the rod 24 to the shifter mechanism of a vehicle. Although not illustrated in this Figure, the BTSI system typically includes further fixtures for connection to the shift linkage. The particular configuration of fixtures will depend upon the particular vehicular application. Some systems are mounted on the steering column of a vehicle whereas others are mounted right on the shifter cable. All of such mounting hardware is well known in the art and may be adapted to the present invention.

In one representative application, the solenoid 10 is disposed to be energized and to provide a downward bias which projects the plunger thereof when the engine of the vehicle is running. The rod 24 is disposed so that the notch 26 is proximate the plunger 20 of the solenoid 10 when the transmission is in the park position. In this manner, the plunger 20 will engage the notch 26. If the operator attempts to shift the vehicle from the park position, the rod 24 will be displaced to the right in the illustrated embodiment; however, the plunger 20 will prevent the vehicle from being shifted out of park as long as the solenoid is energized. In the illustrated embodiment, the solenoid 10 is also interconnected to the braking system so that it will be de-energized when the brake pedal is depressed thereby causing the plunger 20 to be withdrawn from the notch 26 in the rod by an upward bias applied by spring 22 thereby 24 freeing the shifter linkage.

What is notable about the interlock of FIG. 1 is the fact that the notch 26 and plunger 20 establish an angle of contact therebetween which is always positive, that is to say greater than zero. It is this feature which prevents or greatly minimizes preload binding.

Referring now to FIG. 2 there is shown an enlarged, fragmentary view of the system of FIG. 1 illustrating the rod 24 and plunger 20. It will be noted that the notch 26 in the rod 24 form a pair of walls 30,32 therein. As illustrated, the leading wall 30 is inclined at an angle greater than 90° relative to the linear axis A, whereas the other or trailing wall 32 is approximately normal to the linear axis A. The plunger 20 has an angular face 33 thereupon and contact between the leading wall 30 of the notch 26 and the face 33 of the plunger is thereby accomplished. It is notable feature of the present invention that the angle of contact between the plunger 20 and the wall 30 of the notch has a positive value. As used in the context of the present disclosure, angle of contact, is meant to refer to the angle formed between a line drawn through a point of contact between the plunger and wall and perpendicular to the linear axis A of the rod, and a line tangent to the point at which contact is made. In the FIG. 2 embodiment, the angle of contact "a" is defined by line "b" which is perpendicular to the linear axis A of the rod 24 and by the line "c" which is tangent to the point of contact. It will be noted that in the FIG. 2 embodiment, contact is along a line coincident with line "c." It will be appreciated that in some instances, the contact may be established through curved surfaces rather than the planes illustrated in FIG. 2.

Referring now to FIG. 3 there is shown another embodiment of the present invention having a different contact geometry. FIG. 3 depicts another rod 40 including a notch 44 defined therein. This notch includes a front face 46 having a generally s-shaped sigmoidal profile. The FIG. 3 embodiment includes a solenoid plunger 42 which has a right angle geometry and consequently, contact between the plunger 42 and front wall is established in a very small area. In this embodiment, the angle of contact a' is defined by line b' which is perpendicular to the axis "a" at the point of contact and by line c' which is tangent to the sigmoidal face 46 of the notch at the point of contact. Again, it will be noted that this angle is positive, i.e., greater than zero. The prior art systems establishes contact through generally square sided notches and plungers, as for example in the U.S. Pat. No. 5,018,610 or through balls held captive in square sided notches as for example in the U.S. Pat. No.

4,987,968 and in both instances, the angle of contact as defined herein will be zero and preload binding will be a problem.

It is to be understood that there are a variety of geometries of notch and plunger which may be employed in the practice of the present invention provided the plunger and wall of the notch provide a positive angle of contact. Referring now to FIG. 4 there is shown yet another configuration of notch and plunger. The rod 50 of FIG. 4 includes a notch 52 having walls 54,56 which are generally perpendicular to the linear axis A of the rod. In this embodiment, the plunger 58, includes a surface 60 configured to contact the wall 54 of the rod 50 at a positive angle of contact "a." As illustrated, angle of contact "a" is defined by line "b" which is perpendicular to the linear axis A at the point of contact and by line C which is tangent to the front wall 54 at the point of contact. As illustrated, the plunger 58 also includes a second surface 63 which would meet the criteria of the present invention, although it is to be understood that the invention is not so limited and many of the embodiments of BTSI preload force is applied in only one direction and hence only one face of the notch and one portion of the plunger need provide the specified contact geometry.

Referring now to FIGS. 5A and 5B there is shown in cross section one particularly preferred configuration of notch and plunger employed in the present invention. FIG. 5A illustrates a rod 62 having a notch 64 formed therein. The notch 64 is configured to define a leading wall 66 and a trailing wall 68. The leading wall is of a generally sigmoidal profile, that is to say it includes a relatively linear central portion and a rounded top and bottom corner. The trailing wall 68 is generally perpendicular to the linear axis "a" of the rod 62. In this preferred embodiment, the linear portion of the leading face 66 forms an angle, "z," with line "x" perpendicular to the linear axis "a" which angle is preferably in the range of 20°-50°. One particularly preferred angle is 15. The diameter of the rod is 0.250 inch, the depth "d" of the notch is 0.090 inch and the upper corner 67 is radiused at 0.090 inch. The lower corner 69 is radiused at 0.015 inch.

FIG. 5B illustrates a plunger 70 constituting one particularly preferred design utilized in combination with the notched rod 62 of FIG. 5A. The plunger 70 has a diameter of 0.187 inch and front face 72 generally corresponding to the leading wall 66 of the notch 64. The bottom corner 73 is radiused at 0.025 inch. In general, it has been found that it is most advantageous to provide contact between the plunger and wall over a fairly large surface so as to minimize wear of components in service and towards this end, the angle formed by the front face 72 of the plunger 70 will correspond to the angle "z" of the notch. The plunger and notched rod are preferably formed from relatively wear resistant materials such as stainless steel, other metals or high strength polymers. One particular preferred material for the plunger is 303 stainless steel since this is a relatively durable and nonmagnetic material.

It has been found that the breakthrough force achieved by a particular geometry will depend to a large degree upon the material of the rod and plunger, the angle of contact and the area of contact. In a typical BTSI application where the plunger and rod are fabricated from a ferrous alloy and the angle of contact is approximately 15 −45° and the area of contact is approximately 3-10 sq. millimeters, a breakthrough force of approximately 45 to 75 lbs. is achieved. It has further been found that quietness of operation of the BTSI system will be enhanced by providing a gentle radius to the top corner of the notch. In this manner, the angle of contact is the largest when the plunger is nearly withdrawn and this causes a gentle transition which eliminates any noise.

In the FIG. 1 embodiment, there is shown an interlock which is energized by a solenoid having a spring 22 for withdrawing the plunger 20 from the notch 26. As noted above, in the operation of this embodiment, energization of the solenoid applied a downward bias to the plunger 2 immobilizing it in contact with the notch thereby preventing displacement of the rod 24. The spring 22 exerts a bias on the plunger 20 in an upward direction which tends to withdraw the plunger from the notch. The energization of the solenoid thereby withdraws the plunger to a position clear of the notch. It has been found that in particular embodiments, inclusion of the spring is no necessary. The angled relationship of the plunger and notch will cause the notch to displace the plunger in an upward direction if the solenoid is deenergized. Referring now to FIG. 6 there is shown another embodiment of interlock 80 structured in accord with the present invention. This interlock includes many elements in common of that of FIG. 1 and accordingly, similar elements will be referred to by the same referenced numeral. The interlock 80 includes a solenoid having a coil 12 provides a biasing force to the plunger 20 which projects the plunger into a notch 26 and a rod 24. What is notable about the FIG. 6 embodiment is the fact that no biasing spring is included therein. When it is desired to release the interlock, energization of the coil 12 is terminated. Hence the downward bias on the plunger 20 is similarly terminated. Shifting of the vehicle will displace the rod 24 to the right thereby causing the angled wall 82 of the notch 26 to engage the plunger 20 and arch it in an upward direction. It is to be noted that within the context of this application, upward and downward are relative terms and merely specify the opposed nature of raised bias in forces and do not impose geometric limitations upon the present invention.

While the foregoing embodiments have been described in terms of a system including a notched rod, other geometries are possible. For example, the rod may be replaced by a disk, plate or other such rigid member including or appropriately configured notch or hole therein. Also, the plunger may be configured as a plate or similar member including an appropriately configured projection thereupon.

The present invention has primarily been described with reference a BTSI system; however, the principles disclosed herein may be similarly applied to other types of locking systems in which preload is a problem, be such systems solenoid or electromagnet based or solely mechanically actuated. While particular geometries have been described herein, the principles of the present invention extend to any system in which preload binding is substantially eliminated by configuring the engaging members thereof to provide a positive angle of contact and preferably an angle of contact in the range of 15°-50°. In view of the foregoing, it will be appreciated that the drawings, discussion, description and disclosure contained herein are merely meant to illustrate particular embodiments of the present invention and are not meant to be limitations upon the practice thereof. It is the following claims, including all equivalents, which define the scope of the invention.

We claim:

1. An electromagnetic interlock which is preload releasable, said interlock comprising:

a rigid member having a linear axis parallel to a length dimension thereof, said member disposed so as to be displacable along said linear axis and including a notch formed therein, said notch defining an S-shaped, sigmoidal wall in said member;

an electromechanical device including a plunger selectively actuatable from an immobilized state to a second state in response to an electrical input, said plunger, when in said immobilized state, is subject to a downward bias which causes said plunger to engage said notch so as to prevent said member from being displaced along said linear axis and, when in said second state, is operable to permit said member to be displaced along said linear axis, said plunger and notch being configured so that an angle of contact established when they are engaged is always positive.

2. An interlock as in claim 1, wherein said plunger, when in said second state, is subject to an upward bias which moves the plunger clear of the notch.

3. An interlock as in claim 1, wherein the downward bias is removed from said plunger when said plunger is in said second state so that displacement of said member along said linear axis urges the plunger out of engagement with the notch.

4. An interlock as in claim wherein said member is mechanically connected to the shifter linkage of a vehicle so as to prevent shifting thereof when the member is immobilized and said electromechanical device is in electrical communication with a brake system of the vehicle so that the plunger is in the first state when the brake system is not energized and in the second state when the brake system is energized whereby shifting of the vehicle is prevented if the brake system is not energized.

5. An interlock as in claim 1, wherein said plunger and the wall of said notch are configured so that contact therebetween is established via substantially flat surfaces.

6. An interlock as in claim 1, wherein said plunger and wall are configured so that the angle of contact established therebetween is within the range of 20°-50° when they are engaged.

7. An interlock as in claim 6, wherein the angle of contact varies as the plunger is withdrawn from the notch.

8. An interlock as in claim 7, wherein the angle of contact is greater when the plunger is proximate the top of the notch than it is when the plunger is proximate the root of the notch.

9. An interlock as in claim 1, wherein the plunge is made of stainless steel.

10. A preload releasable brake-transmission shift interlock for a motor vehicle, said interlock comprising a generally elongated rod having a linear axis parallel to a length dimension thereof, said rod configured to mechanically engage the shifter linkage of said motor vehicle and being disposed so as to be displaceable along said linear axis, said rod including a notch formed therein and defining a wall S-shaped sigmoidal in said rod;

a solenoid including a plunger selectively biasable from a first position in which it engages the notch in the rod and prevents the rod from being displaced along the linear axis to a second position in which it is clear of the notch and in which it permits the rod to be displaced along the linear axis;

a brake system energization circuit associated with said vehicle, the solenoid being in electrical communication with said brake system energization circuit such that it is in said first position when the brakes are not activated and in the second position when the brakes are activated;

the plunger and wall S-shaped sigmoidal of the interlock are configured so that the angle of contact established therebetween when the plunger is in the first position is always positive.

11. An interlock as in claim 10, wherein said rod includes an adjustable coupling linkage for fixing said rod to the shifter linkage of the motor vehicle.

* * * * *

UNITED STATES PATENT AND TRADEMARK OFFICE
CERTIFICATE OF CORRECTION

PATENT NO. : 5,176,231
DATED : 01-05-93
INVENTOR(S) : Pontiac Coil, Inc.

It is certified that error appears in the above-identified patent and that said Letters Patent is hereby corrected as shown below:

```
Column 4, Line 55, Delete "s-shaped" Insert --S-shaped--
Column 4, Line 62, Delete "the sigmoidal"
                   Insert --the S-shaped Sigmoidal--
Column 5, Line 67, Delete "15 -45°" Insert --15 - 45°--
Column 6, Line 13, Delete "2" Insert --20--
Column 7, Line 33, Delete "claim wherein" Insert --claim 1
                   wherein--
Column 8, Line 14, Delete "plunge" Insert --plunger--
Column 8, Line 24, Delete "a wall S-shaped"
                   Insert --a S-shaped sigmoidal wall--
Column 8, Line 37, Delete "and wall S-shaped Sigmoidal"
                   Insert --and S-shaped Sigmoidal wall--
```

Signed and Sealed this

Twenty-sixth Day of October, 1993

Attest:

BRUCE LEHMAN

*Attesting Officer*     Commissioner of Patents and Trademarks